United States Patent
Sung (10) Patent No.: US 11,850,996 B2
(45) Date of Patent: Dec. 26, 2023

(54) APPARATUS AND METHOD FOR CONTROLLING BEAM PATTERN

(71) Applicant: HYUNDAI MOBIS CO., LTD., Seoul (KR)

(72) Inventor: Jun Young Sung, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/869,969

(22) Filed: Jul. 21, 2022

(65) Prior Publication Data

US 2023/0158941 A1 May 25, 2023

(30) Foreign Application Priority Data

Nov. 22, 2021 (KR) .................... 10-2021-0161716

(51) Int. Cl.
*B60Q 1/14* (2006.01)
*H05B 47/105* (2020.01)
*B60Q 1/30* (2006.01)

(52) U.S. Cl.
CPC ........... *B60Q 1/143* (2013.01); *H05B 47/105* (2020.01); *B60Q 1/30* (2013.01); *B60Q 2300/054* (2013.01); *B60Q 2300/112* (2013.01)

(58) Field of Classification Search
CPC .... B60Q 1/143; B60Q 1/30; B60Q 2300/054; B60Q 2300/112; B60Q 5/005; H05B 47/105; H05B 47/165
See application file for complete search history.

(56) References Cited

U.S. PATENT DOCUMENTS

| | | | |
|---|---|---|---|
| 10,821,886 B1* | 11/2020 | Breedvelt-Schouten | ..................... B60Q 1/547 |
| 2007/0268159 A1* | 11/2007 | Futamura | ............... B60Q 1/143 340/933 |
| 2016/0379412 A1* | 12/2016 | Butler | .................... G02B 27/01 345/633 |
| 2017/0043702 A1* | 2/2017 | Park | ....................... B60Q 1/076 |
| 2019/0031085 A1* | 1/2019 | Ba | .......................... B60Q 1/085 |
| 2020/0180504 A1* | 6/2020 | Kim | ...................... F21S 41/285 |

FOREIGN PATENT DOCUMENTS

| | | | | | |
|---|---|---|---|---|---|
| CA | 2684790 A1 | * | 9/2009 | ....... | G11B 20/10009 |
| CN | 207374223 U | * | 5/2018 | | |
| CN | 112197239 A | * | 1/2021 | ............... | B60Q 1/04 |
| CN | 110857766 B | * | 3/2023 | ........... | B60Q 1/1423 |
| JP | 2014029858 A | * | 2/2014 | ............. | B60Q 1/085 |
| KR | 20140076192 A | * | 1/2021 | ....... | G11B 20/10009 |

\* cited by examiner

*Primary Examiner* — Abdullah A Riyami
*Assistant Examiner* — Syed M Kaiser
(74) *Attorney, Agent, or Firm* — NovoTechIP International PLLC (57) ABSTRACT

Disclosed are an apparatus and method for controlling a beam pattern. The apparatus includes an output device that outputs a beam pattern, and a controller that analyzes a driving tendency of a driver and adjusts the beam pattern based on the analyzed driving tendency of the driver.

9 Claims, 8 Drawing Sheets

APPARATUS AND METHOD FOR CONTROLLING BEAM PATTERN

CROSS-REFERENCE TO RELATED APPLICATIONS

This application claims the benefit of priority to Korean Patent Application No. 10-2021-0161716, filed in the Korean Intellectual Property Office on Nov. 22, 2021, the entire contents of which are incorporated herein by reference.

BACKGROUND

1. Technical Field

The present disclosure relates to an apparatus and a method for controlling or adjusting a beam pattern.

2. Discussion of Related Art

In general, the head lamp of a vehicle is used to secure a stable front view at night or in a tunnel in which the surrounding environment is dark, fog, rain, or the like. Adaptive driving beam (ADB) or high beam assistance (HBA), which is a driving safety system, can enhance the visibility of a host vehicle while minimizing the damage to the glare of others.

In the trend of electrification of vehicles, a user setting mode (USM) function that can set equipment according to the taste and preference of a driver has been introduced, and thus, the driver may customize a vehicle lamp such as a head lamp or a rear lamp.

SUMMARY

The present disclosure has been made to solve the above-mentioned problems occurring in the prior art while advantages achieved by the prior art are maintained intact.

In the trend of electrification of vehicles, the number of components and functions that can be set by a driver increases, so that it is difficult to operate the user setting mode. Thus, an aspect of the present disclosure provides an optimal beam pattern for each driver automatically through the vehicle system without the driver directly operating the user setting mode.

In addition, the driving tendency of a driver is analyzed to provide an optimal beam pattern for each driver, thereby shifting the paradigm of electric component technology from vehicle model-centric to driver-centric.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for controlling or adjusting a beam pattern includes an output device that outputs the beam pattern, and a controller that analyzes a driving tendency of a driver and adjusts the beam pattern based on the analyzed driving tendency of the driver.

According to an embodiment, the controller may analyze the driving tendency of the driver or adjust the beam pattern by using a machine learning model.

According to an embodiment, the apparatus may further include at least one sensor that obtains driving information, and the controller may analyze the driving tendency of the driver based on the obtained driving information.

According to an embodiment, the at least one sensor may obtain a vehicle speed, and the controller may operate when the obtained vehicle speed is equal to or greater than an operation speed, and stopping adjusting the beam pattern when the obtained vehicle speed is less than a release speed.

According to an embodiment, the controller may control at least one of a shadow zone area and a recovery time of the beam pattern.

According to an embodiment, the controller may compare the driving tendency of the driver with preset reference information and generate a comparison result and determine output information based on the comparison result and adjust the beam pattern based on the output information According to an embodiment, the controller may expand the shadow zone area of the beam pattern and extend the recovery time of the beam pattern when the driving tendency of the driver is equal to or greater than the preset reference information, and may reduce the shadow zone area of the beam pattern and shorten the recovery time of the beam pattern when the driving tendency of the driver is less than the reference information.

According to an embodiment, the apparatus may further include a communication device that receives road environment information, and the controller may adjust the first or second speed based on the received road environment information.

According to an embodiment, the controller may analyze the driving tendency of the driver based on a safe driving score of the driver.

According to another aspect of the present disclosure, a method of controlling a beam pattern includes analyzing a driving tendency of a driver, adjusting a beam pattern based on the driving tendency of the driver, and outputting the adjusted beam pattern.

According to an embodiment, the method may further include obtaining driving information, wherein the beam pattern is adjusted further based on the obtained driving information.

According to an embodiment, the method may further include receiving road environment information, wherein the beam pattern is adjusted further based on the received road environment information.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure.

It is to be understood that a singular form of a noun corresponding to an item in the present disclosure may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

In the present disclosure, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As used herein, the term "module" or "part" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program or an application) including one or more instructions that are stored in a storage medium (e.g., a memory) that is readable by a machine. For example, a processor of a machine may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

Figure 1:
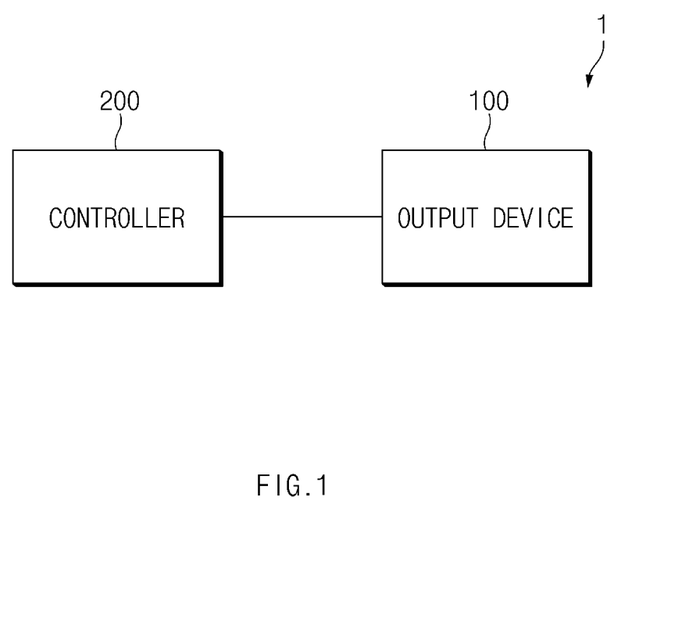
FIG. 1 is a block diagram illustrating an apparatus for controlling or adjusting a beam pattern according to an embodiment of the present disclosure.

FIG. 1 is a block diagram illustrating an apparatus for controlling a beam pattern, which may include adjusting the beam pattern, according to an embodiment of the present disclosure.

Referring to FIG. 1, an apparatus 1 for controlling a beam pattern may include an output device 100 and a controller 200.

The output device 100 may output a beam pattern. According to various embodiments, the output device 100 may refer to a lamp existing in a vehicle, such as a head lamp, a rear lamp, a tail lamp, and the like. The output device 100 may include a light source for irradiating light, and may be an LED head lamp, a laser head lamp, or a halogen head lamp depending on the type of light source used. In addition, the output device 100 may be an adaptive driving beam (ADB). For example, an adaptive driving beam (ADB) may recognize an object and adjust the turn on and off of the light source corresponding to the location of the object.

The output device 100 may output a beam pattern by controlling the turn on and off of the light source. According to an embodiment, the output device 100 may control the turn on and off of the light source in response to the control of the controller 200. For example, when the output device 100 is an adaptive driving beam, the ADB head lamp may output a desired beam pattern by selectively turning on and off each light source using an LED matrix as a light source. For example, the beam pattern may include a pattern such as a dark band area of the beam irradiation area, a recovery time of the light source, and the brightness of the light source.

The controller 200 may analyze the driving tendency of a driver. The driving tendency of a driver may refer to a habit or tendency appearing in the driving process of a driver. For example, the driving tendency of a driver may refer to a tendency to drive safely, a tendency to drive recklessly, a tendency to rapidly accelerate, a tendency to suddenly brake, and the like.

According to an embodiment, the controller 200 may analyze the driving tendency based on the safe driving score of a driver. For example, the safe driving score may refer to a safe driving score for insurance submission, and may be a score calculated based on details of driver's license penalty points. For example, the controller 200 may analyze whether the driving tendency of the driver is close to the safe driving tendency or the reckless driving tendency based on the safe driving score.

The controller 200 may control the beam pattern based on the driving tendency of the driver. The controller 200 may control a shadow zone area, a recovery time, brightness, and the like of the beam pattern based on the driving tendency of the driver. For example, when the driving tendency of the driver is the tendency to drive safely, the controller 200 may reduce the shadow zone area or shorten the recovery time.

According to an embodiment, the controller 200 may analyze the driving tendency of the driver or control the beam pattern by using a machine learning model. The machine learning model may include various types of models such as a convolutional neural network (CNN), a region with convolutional neural network (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzmann machine (RBM), a fully convolutional network (FCN), a long short-term memory (LSTM), and the like, but the embodiment is not limited to the above-described models. The controller 200 may include a processor, a module, software, and the like for performing a machine learning model.

The machine learning model may undergo a pre-learning process, and a pre-trained machine learning model may be used. The machine learning model may learn a scheme of receiving information about an acceleration level, a safety distance, a response speed, and the like to analyze a driving tendency, and learn a scheme of receiving the driving tendency to control a beam pattern.

Figure 2:
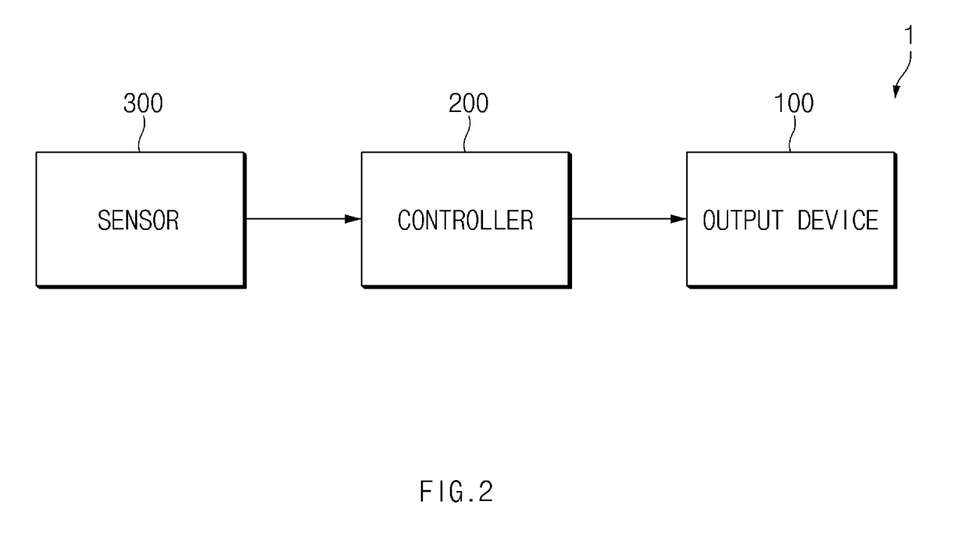
FIG. 2 is a block diagram illustrating an apparatus for controlling a beam pattern that further includes a sensor according to an embodiment of the present disclosure.

FIG. 2 is a block diagram illustrating an apparatus for controlling a beam pattern that further includes a sensor according to an embodiment of the present disclosure.

Referring to FIG. 2, the apparatus 1 for controlling a beam pattern may include the output device 100, the controller 200 and at least one sensor 300. According to an embodiment, the apparatus 1 for controlling a beam pattern shown in FIG. 2 may further include the at least one sensor 300 compared to the apparatus 1 for controlling a beam pattern shown in FIG. 1.

The at least one sensor 300 may be a sensor existing inside or outside the vehicle, and may refer to, for example, an accelerator pedal sensor, a steering sensor, a LiDAR sensor, and the like.

The at least one sensor 300 may obtain driving information from a driver's manipulation and an internal or external environment of the vehicle. For example, the driving information may include acceleration information, safety distance information, response speed information, and the like. The acceleration information may be obtained from an accelerator pedal sensor, and the safety distance information may be obtained from a LiDAR sensor. In this case, the safety distance information may represent information on how much distance from a neighboring vehicle (e.g., a distance from a front, side, and/or rear vehicle) is maintained.

The controller 200 may analyze the driving tendency of the driver based on the driving information obtained from the at least one sensor 300. The controller 200 may analyze whether the driving tendency of the driver is a tendency to drive safely or a tendency to drive recklessly based on acceleration information, response speed information, safe distance information, and the like. For example, as a result of analyzing the driving tendency of the driver based on the driving information obtained from the at least one sensor 300, when the driver fails to maintain a safe distance, accelerates frequently and/or brakes suddenly, the controller 200 may analyze the driving tendency of the driver as being close to the tendency to drive recklessly.

According to an embodiment, the controller 200 may determine output information based on a comparison result of comparing the driving tendency of the driver with preset reference information, and control the beam pattern based on the output information. For example, when the driving tendency is greater than or equal to preset first reference information (reference information 1) and less than second reference information (reference information 2), the controller 200 may apply first output information (output information 1) to control or adjust the beam pattern. According to an embodiment, the reference information may be set differently according to a vehicle model, a road environment, and the like, and accordingly, the output information may be set to correspond to the reference information.

According to an embodiment, the controller 200 may control at least one of a shadow zone and a recovery time of the beam pattern based on output information.

According to an embodiment, a shadow zone area may mean an area where the output device 100 does not irradiate light to prevent glare of another party. For example, the adaptive driving beam (ADB) may not irradiate light by turning off the light source in the area where an object exists in order to prevent glare of another party. The shadow zone area may include a shadow zone main area and a shadow zone margin area. In this case, the shadow zone main area may mean an area in which an object exists. The shadow zone margin area is an area in which any objects do not exist, but may be an extra area set up, down, left and right of the shadow zone main area to prevent glare of an object.

For example, when the vehicle travels left and right, the beam output by the output device 100 is also shaken left and right. In this case, because it takes time for the adaptive driving beam (ADB) to recognize the object and the controller 200 to adjust the light-on/off of the light source, glare of another party may occur due to the interval between the vehicle movement and the beam pattern control. In this situation, it is possible to alleviate the glare of another party by setting an extra shadow zone margin area. As the shadow zone margin area is set larger, the glare of the other party may be alleviated, and as the shadow zone margin area is set smaller, the driver's visibility may be increased. Accordingly, the initial size of the shadow zone margin area may be variously designed in consideration of the specification of the output device 100 and the intention of the driver.

According to an embodiment, the recovery time may mean a delay time until the light source of the output device 100 is turned off and then turned on again. For example, when the output device 100 is an adaptive driving beam (ADB), the adaptive driving beam (ADB) may recognize an object and turn off the light source corresponding to the location of the object, and when an object does not exist in the corresponding location due to the driver's operation, the light source that was turned off may be turned on again. In this case, when the light source that has been turned off is turned on immediately, driving in curves or changing lanes may cause the driver to be dazzled and may cause glare of another party. Accordingly, when the light source that has been turned off is turned on again, the output device 100 may provide a delay time when turning on the light source, thereby preventing the driver from dazzling and reducing the glare of another party. According to various embodiments, when the light source is turned on and then turned off, the output device 100 may not provide a delay time because it does not cause glare of another party and does not give the driver dazzle.

According to an embodiment, the controller 200 may control the shadow zone area and recovery time based on the driving tendency of the driver. The controller 200 may enlarge the shadow zone area and extend the recovery time when the driving tendency of the driver is greater than or equal to reference information, and may reduce the shadow zone area and shorten the recovery time when the driving tendency of the driver is less than the reference information. The control of the shadow zone area and the recovery time according to the driving tendency is not limited thereto, and may be set differently according to the driving tendency.

For example, as the reckless driving tendency is severe, the shaking of the beam irradiation area according to the driving of the driver is severe, and the location of an object with respect to the vehicle is likely to be changed. Therefore, when the driving tendency of a driver indicates a reckless driving tendency and the reference information also indicates the reckless driving degree, as the reckless driving tendency of the driver intensifies, the controller 200 may enlarge the shadow zone area and extend the recovery time. This may alleviate the glare of another party and prevent the driver from dazzling.

According to an embodiment, the at least one sensor 300 may acquire vehicle speed information. To this end, the at least one sensor 300 may include a speed sensor, and may obtain speed information of the current vehicle from the speed sensor.

The controller 200 may operate when the speed of the vehicle corresponding to the vehicle speed information is equal to or greater than an operation speed (i.e., first speed), and may stop the operation of controlling or adjusting the beam pattern when the vehicle speed is less than a release speed (e.g., second speed). For example, the operation speed may mean the minimum speed at which the controller 200 operates, and the release speed may mean a maximum speed at which the controller 200 stops the operation. According to an embodiment, the operation speed may be set higher than the release speed. For example, when the operation speed and the release speed of the controller 200 are set to 60 Km/h and 40 Km/h, respectively, when the vehicle speed is 60 Km/h or higher while the driver is driving, the controller 200 may start the operation, and when the vehicle speed is less than 40 Km/h while driving, the controller 200 may stop the operation. The adaptive driving beams (ADB) may control the light-on/off of the light source to prevent the glare of another party. However, because the usefulness of the adaptive driving beam (ADB) is reduced when the vehicle is mainly driven at a low speed, for example, on a general road, the efficiency of the controller 200 can be increased by setting the operation speed and the release speed.

Figure 3:
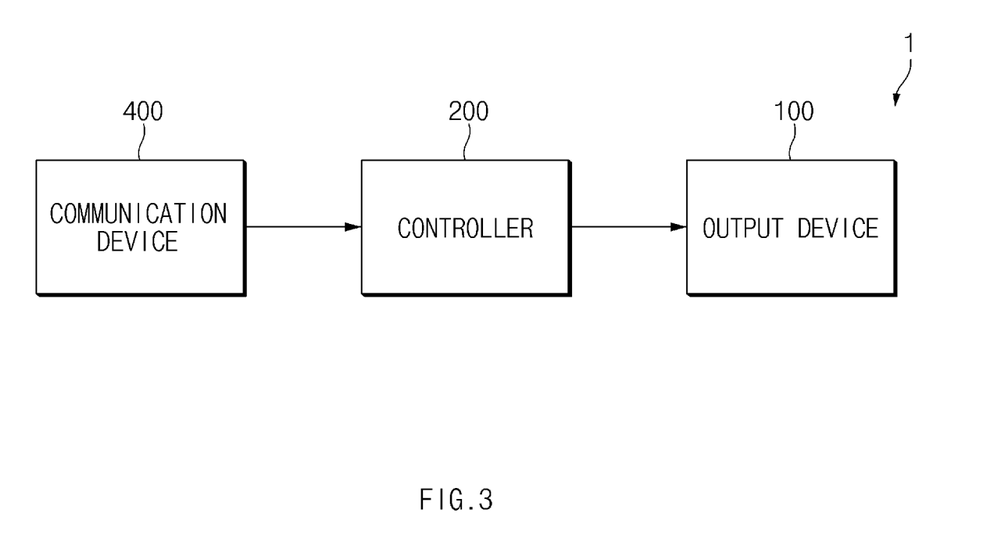
FIG. 3 is a block diagram illustrating an apparatus for controlling a beam pattern further including a communication device according to an embodiment of the present disclosure.

FIG. 3 is a block diagram illustrating an apparatus for controlling a beam pattern further including a communication device according to an embodiment of the present disclosure.

Referring to FIG. 3, the apparatus 1 for controlling a beam pattern may include the output device 100, the controller 200, and a communication device 400 for receiving road environment information. According to an embodiment, the apparatus 1 for controlling a beam pattern illustrated in FIG. 3 may further include the communication device 400 compared to the apparatus 1 for controlling a beam pattern illustrated in FIG. 1.

The communication device 400 may receive the road environment information from the inside or outside of a vehicle. The road environment information may refer to information on a type of road, a state of road, a degree of congestion, and whether there is an accident. The communication device 400 may be a communication device (e.g., a navigation device) capable of GPS communication and satellite communication.

The controller 200 may adjust the operation speed and the release speed based on the road environment information received by the communication device 400. For example, when the road environment is a highway, the speed of the vehicle is generally high, and accordingly, the speed change and the location change of the vehicle may be performed quickly, so the possibility of glare by the output device 100 may be high compared to a general road. Accordingly, the controller 200 may alleviate it by setting the operation speed and the release speed to be relatively high. Meanwhile, when the road environment is a general road such as a city, the possibility of glare by the output device 100 is low because the vehicle speed is low due to the speed limit or red light, so the operation speed and release speed may be set low.

According to an embodiment, the controller 200 may further include a data receiver capable of receiving driver's driving tendency data. The controller 200 may receive the driver's driving tendency data through the data receiver and use it for driving tendency analysis.

According to an embodiment, the controller 200 may further include a data storage unit for storing the driving tendency analysis result and the beam pattern control result. The controller 200 may provide a beam pattern optimized for each driver by storing the driving tendency analysis result and the beam pattern control result.

Figure 4:
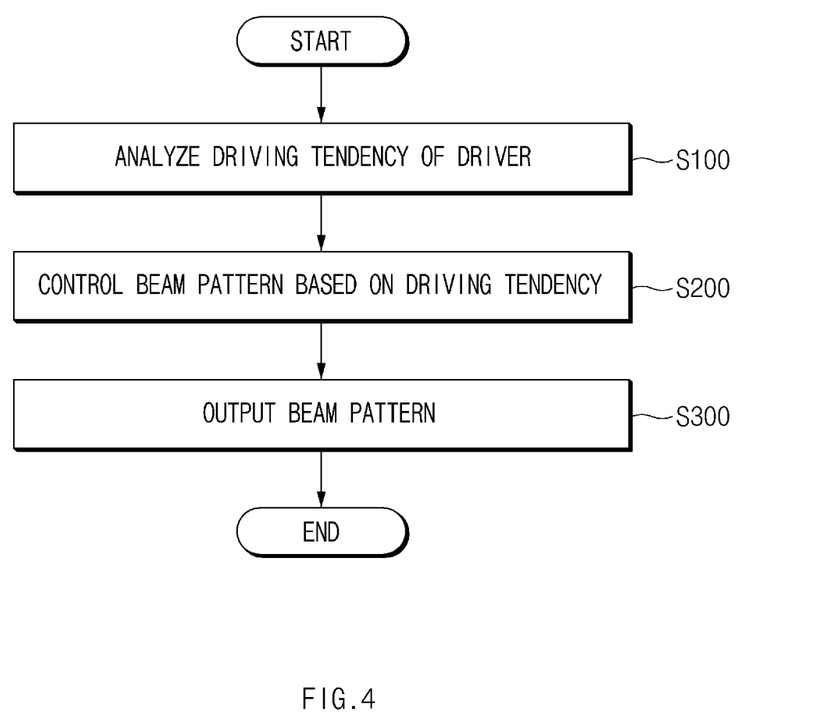
FIG. 4 is a flowchart illustrating a method of controlling a beam pattern according to an embodiment of the present disclosure.

FIG. 4 is a flowchart illustrating a method of controlling a beam pattern according to an embodiment of the present disclosure.

Referring to FIG. 4, a method of controlling a beam pattern may include analyzing a driving tendency of a driver, controlling the beam pattern based on the driving tendency, and outputting the beam pattern.

In operation S100, the controller 200 may analyze the driving tendency of the driver. In operation S200, the controller 200 may control the beam pattern based on the driving tendency. According to an embodiment, the controller 200 may control at least one of the shadow zone area of the beam pattern and the recovery time based on the driving tendency of the driver.

In operation S300, the output device 100 may output the beam pattern.

Figure 5:
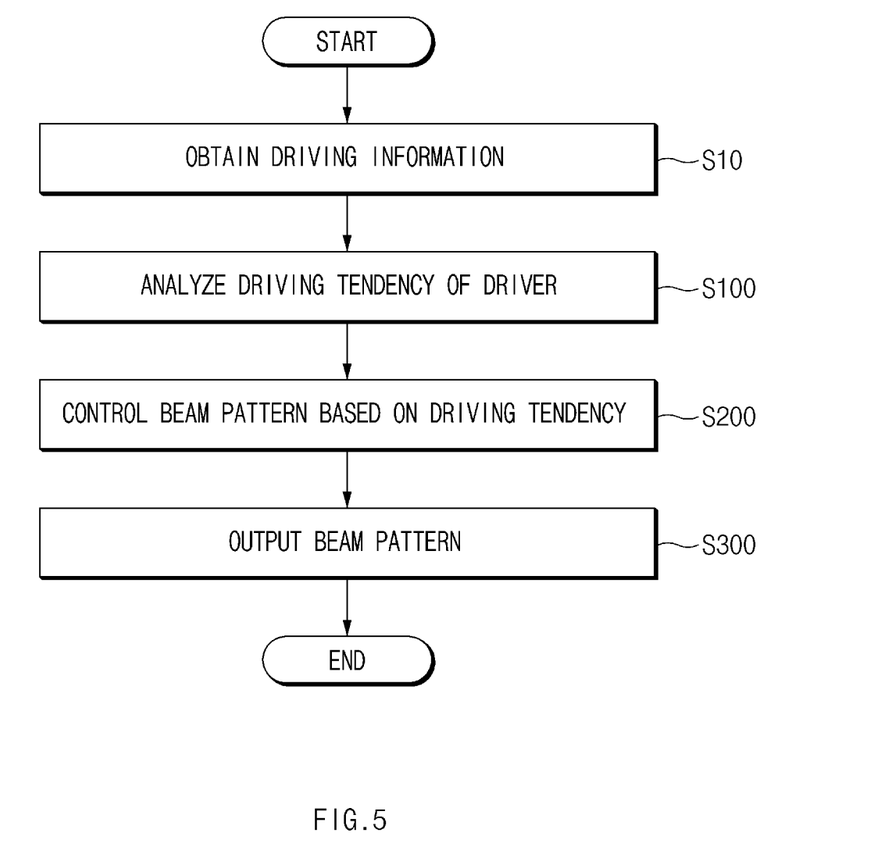
FIG. 5 is a flowchart illustrating a method of controlling a beam pattern further including an operation of obtaining driving information according to an embodiment of the present disclosure.

FIG. 5 is a flowchart illustrating a method of controlling a beam pattern further including an operation of obtaining driving information according to an embodiment of the present disclosure.

Referring to FIG. 5, a method of controlling a beam pattern may include an operation of obtaining driving information.

In operation S10, the at least one sensor 300 may obtain the driving information. In operation S100, the controller 200 may analyze the driving tendency of the driver based on the driving information obtained through the at least one sensor 300. In addition, operations S200 and S300 may be substantially the same as operations S200 and S300 illustrated in FIG. 4, respectively.

Figure 6:
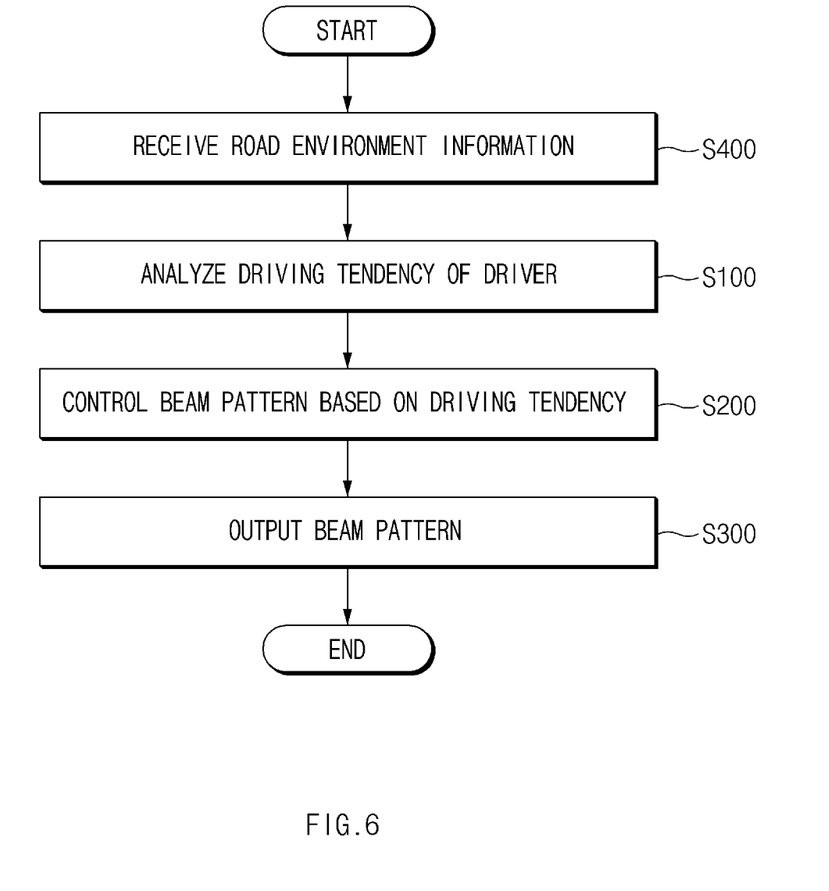
FIG. 6 is a flowchart illustrating a method of controlling a beam pattern further including an operation of receiving road environment information according to an embodiment of the present disclosure.

FIG. 6 is a flowchart illustrating a method of controlling a beam pattern further including an operation of receiving road environment information according to an embodiment of the present disclosure.

Referring to FIG. 6, the beam pattern control method may further include receiving road environment information.

In operation S400, the communication device 400 may receive the road environment information. The controller 200 may adjust the operation speed and the release speed based on the received road environment information. In addition, operations S100, S200 and S300 may be substantially the same as operations S100, S200 and S300 illustrated in FIG. 4, respectively.

Figure 7:
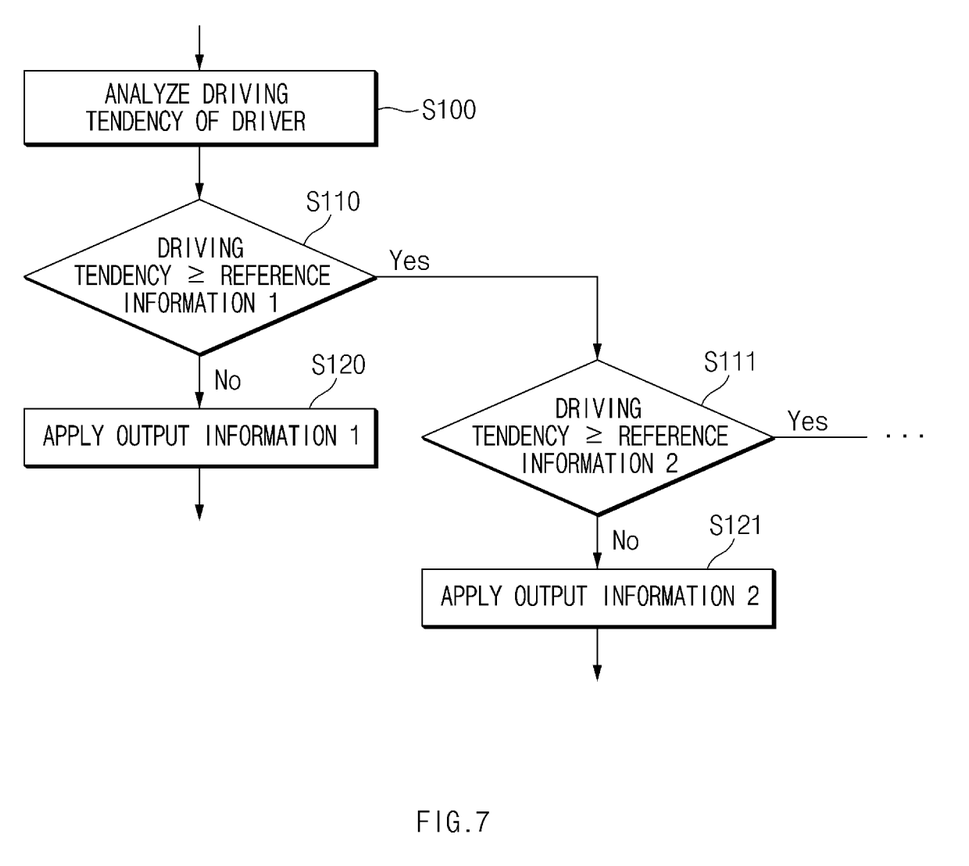
FIG. 7 is a flowchart illustrating logic for controlling a beam pattern according to an embodiment of the present disclosure.

FIG. 7 is a flowchart illustrating logic for controlling a beam pattern according to an embodiment of the present disclosure. The operations illustrated in FIG. 7 may be an example of implementing operation S200 of FIGS. 4 to 6.

Referring to FIG. 7, as an example of operation S200 of controlling a beam pattern based on a driving tendency, in operations S120 and S121, it is possible to apply the output information to the beam pattern based on a comparison result of operations S110 and S111 of comparing the driving tendency analyzed in operation S100 with the reference information. The scheme of comparing the driving tendency with the reference information in FIG. 7 is only an example and the embodiment is not limited thereto.

Figure 8:
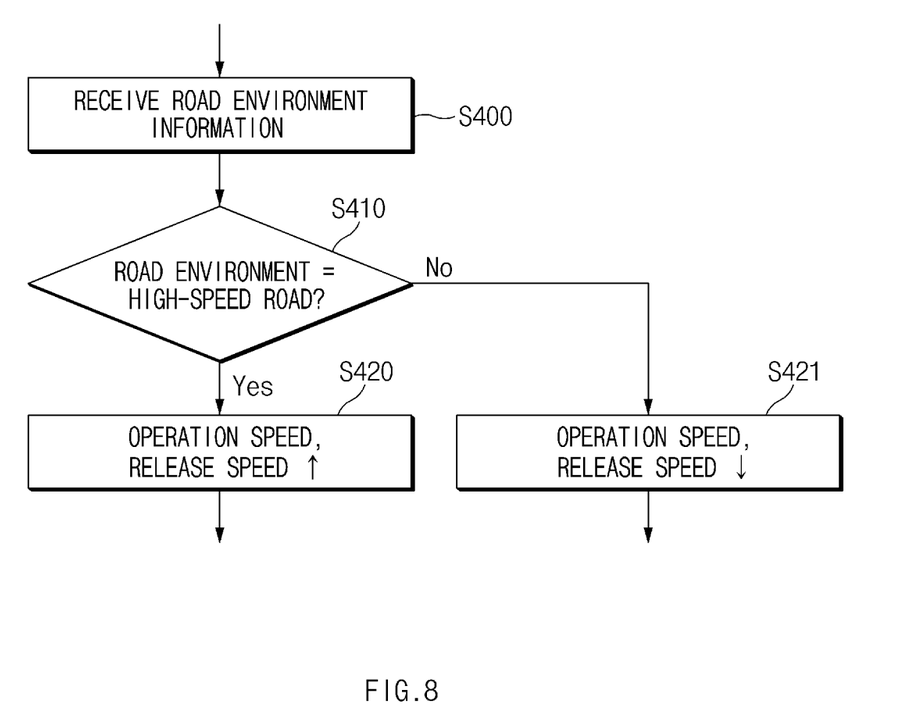
FIG. 8 is a flowchart illustrating logic for adjusting an operation speed and a release speed of a controller according to an embodiment of the present disclosure.

FIG. 8 is a flowchart illustrating logic for adjusting an operation speed and a release speed of a controller according to an embodiment of the present disclosure.

Referring to FIG. 8, the communication device 400 may receive the road environment information in operation S400. For example, when the received road environment is a high-speed road, the controller 200 may increase the operation speed and the release speed. When the road environment is not a high-speed road, the controller 200 may lower the operation speed and the release speed.

According to the embodiments of the present disclosure, the apparatus for controlling a beam pattern may provide an optimal beam pattern for each driver by analyzing the driving tendency of the driver based on machine learning.

In addition, according to the embodiments of the present disclosure, the apparatus for controlling a beam pattern may reduce the glare of another party and increase the driver's visibility by providing an optimal beam pattern for each driver.

In addition, according to the embodiments of the present disclosure, the apparatus for controlling a beam pattern may analyze the driving tendency of the driver and automatically provide an optimal beam pattern for each driver without setting the user setting mode, thereby solving the difficulty of using the user setting mode and providing convenience to the driver.

In addition, various effects that are directly or indirectly understood through the present disclosure may be provided.

In addition, terms such as "comprises," "includes" or "have" described above mean that the corresponding element may be embedded unless otherwise stated, so it means that other elements may be further included but not excluded. Unless defined otherwise, all terms used herein, including technical or scientific terms, have the same meanings as those generally understood by those skilled in the art to which the present disclosure pertains. The terms defined in the generally used dictionaries should be construed as having the meanings that coincide with the meanings of the contexts of the related technologies, and should not be construed as ideal or excessively formal meanings unless clearly defined in the specification of the present disclosure.

Although exemplary embodiments of the present disclosure have been described for illustrative purposes, those skilled in the art will appreciate that various modifications, additions and substitutions are possible, without departing from the scope and spirit of the disclosure. Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. An apparatus for adjusting a beam pattern of a vehicle, comprising:
    an output device configured to output the beam pattern; and
    a controller configured to:
        compare a data value representing a driving tendency of a driver of the vehicle with a reference value;
        in response to the data value being equal to or greater than the reference value, performing at least one of (1) expanding a shadow zone area of the beam pattern and (2) increasing a recovery time of the beam pattern; and
        in response to the data value being smaller than the reference value, performing at least one of (1) reducing the shadow zone area of the beam pattern and (2) shortening the recovery time of the beam pattern.

2. The apparatus of claim 1, wherein the controller is configured to analyze the driving tendency of the driver using a machine learning model.

3. The apparatus of claim 1, further comprising at least one sensor configured to obtain driving information, wherein the controller is configured to analyze the driving tendency of the driver based on the obtained driving information.

4. The apparatus of claim 3, wherein:
    the at least one sensor is configured to obtain a vehicle speed, and
    the controller is configured for:
        adjusting the beam pattern when the obtained vehicle speed is equal to or greater than a first speed, and
        stopping adjusting the beam pattern when the obtained vehicle speed is less than a second speed.

5. The apparatus of claim 1, further comprising a communication device configured to receive road environment information,
    wherein the controller is configured to (1) adjust the beam pattern when a vehicle speed is equal to or greater than a first speed and (2) stop adjusting the beam pattern when the vehicle speed is less than a second speed, and
    wherein the controller is configured to adjust the first or second speed based on the received road environment information.

6. The apparatus of claim 1, wherein the controller is configured to analyze the driving tendency of the driver based on a safe driving score of the driver.

7. A method of controlling a beam pattern of a vehicle, comprising:
    comparing a data value representing a driving tendency of a driver of the vehicle with a reference value;
    in response to the data value being equal to or greater than the reference value, performing at least one of (1) expanding a shadow zone area of the beam pattern and (2) increasing a recovery time of the beam pattern;
    in response to the data value being smaller than the reference value, performing at least one of (1) reducing the shadow zone area of the beam pattern and (2) shortening the recovery time of the beam pattern; and
    outputting the adjusted beam pattern.

8. The method of claim 7, further comprising:
obtaining driving information; and
adjusting the beam pattern further based on the obtained driving information.

9. The method of claim 7, further comprising:
receiving road environment information; and
adjusting the beam pattern further based on the received road environment information.

\* \* \* \* \*